United States Patent
Frenzel et al.

(10) Patent No.: US 9,524,439 B2
(45) Date of Patent: Dec. 20, 2016

(54) MONITORING UNIT AND ASSISTANCE SYSTEM FOR MOTOR VEHICLES

(75) Inventors: Henryk Frenzel, Regensburg (DE);
Thorsten Köhler, Lindau (DE);
Stephan Voltz, Happurg (DE); Ulrich Wagner, Kressbronn am Bodensee (DE)

(73) Assignee: Continental Automotive GmbH, Hannover (DE)

( * ) Notice: Subject to any disclaimer, the term of this patent is extended or adjusted under 35 U.S.C. 154(b) by 1782 days.

(21) Appl. No.: 10/593,840

(22) PCT Filed: May 6, 2005

(86) PCT No.: PCT/EP2005/052080
§ 371 (c)(1),
(2), (4) Date: Sep. 22, 2006

(87) PCT Pub. No.: WO2005/115820
PCT Pub. Date: Dec. 8, 2005

(65) Prior Publication Data
US 2007/0177014 A1    Aug. 2, 2007

(30) Foreign Application Priority Data

May 25, 2004 (DE) ........................ 10 2004 025 541
Jun. 1, 2004 (DE) ........................ 10 2004 026 591

(51) Int. Cl.
*H04N 7/18*    (2006.01)
*H04N 9/04*    (2006.01)
(Continued)

(52) U.S. Cl.
CPC ............. *G06K 9/00818* (2013.01); *G02B 5/20* (2013.01); *G06K 9/00798* (2013.01);
(Continued)

(58) Field of Classification Search
CPC ............ G06K 9/00818; G06K 9/00798; G06K 9/2018; H04N 9/04; H04N 9/64
(Continued)

(56) References Cited

U.S. PATENT DOCUMENTS 3,971,065 A    7/1976  Bayer
4,330,797 A *  5/1982  Yokokawa ......... H04N 5/23293
                                                       313/365
(Continued)

FOREIGN PATENT DOCUMENTS

EP    0 830 267 B1    7/2002
EP    1 418 089 A2    5/2004
(Continued)

OTHER PUBLICATIONS

Gislin Dagnelie, "Visual Prosthetics", Physiology, Bioengineering, Rehabilitation, Springer, Chapter 1, 2011, pp. 3 to 21.
(Continued)

*Primary Examiner* — Tat Chio
*Assistant Examiner* — On S Mung
(74) *Attorney, Agent, or Firm* — W. F. Fasse (57) ABSTRACT

A monitoring unit for the exterior in the direction of travel of a motor vehicle includes at least one camera system with an image recording sensor. The sensor has color encoding in some regions and, otherwise, monochrome encoding. An assist system is also provided with such a monitoring unit, in particular a traffic sign and/or lane recognition assist system.

23 Claims, 5 Drawing Sheets

(51) Int. Cl.
*H04N 9/64* (2006.01)
*G06K 9/00* (2006.01)
*G06K 9/20* (2006.01)
*G06T 1/00* (2006.01)
*G02B 5/20* (2006.01)
*H04N 5/369* (2011.01)

(52) U.S. Cl.
CPC .......... *G06K 9/2018* (2013.01); *G06T 1/0007* (2013.01); *H04N 5/369* (2013.01); *H04N 9/04* (2013.01); *H04N 9/64* (2013.01)

(58) Field of Classification Search
USPC .......................... 348/143, 148, 149; 340/435
See application file for complete search history.

(56) References Cited

U.S. PATENT DOCUMENTS

| | | | |
|---|---|---|---|
| 5,221,963 A * | 6/1993 | Hashimoto et al. | 348/234 |
| 5,987,174 A * | 11/1999 | Nakamura et al. | 382/199 |
| 6,320,176 B1 * | 11/2001 | Schofield et al. | 250/208.1 |
| 6,320,618 B1 | 11/2001 | Aoyama | |
| 6,455,831 B1 | 9/2002 | Bandera et al. | |
| 6,573,490 B2 | 6/2003 | Hochstein | |
| 6,977,683 B1 | 12/2005 | Okada | |
| 7,259,367 B2 | 8/2007 | Reime | |
| 8,588,920 B2 | 11/2013 | Naughton | |
| 2001/0052938 A1 * | 12/2001 | Itoh | 348/246 |
| 2002/0039142 A1 * | 4/2002 | Zhang | 348/234 |
| 2002/0044209 A1 | 4/2002 | Saito | |
| 2002/0081029 A1 | 6/2002 | Marugame | |
| 2003/0001121 A1 | 1/2003 | Hochstein | |
| 2003/0048493 A1 * | 3/2003 | Pontifex et al. | 358/514 |
| 2004/0008410 A1 | 1/2004 | Stam et al. | |
| 2004/0090550 A1 | 5/2004 | Park | |
| 2004/0091133 A1 * | 5/2004 | Monji | 382/104 |
| 2004/0141057 A1 * | 7/2004 | Pallaro et al. | 348/148 |
| 2006/0215049 A1 | 9/2006 | Sandini et al. | |
| 2008/0043099 A1 | 2/2008 | Stein et al. | |
| 2010/0134616 A1 | 6/2010 | Seger et al. | |
| 2013/0070109 A1 | 3/2013 | Gove et al. | |
| 2016/0080659 A1 | 3/2016 | Kroekel et al. | |

FOREIGN PATENT DOCUMENTS

| | | |
|---|---|---|
| EP | 1 764 835 | 3/2007 |
| JP | 9-35065 | 2/1997 |
| JP | 11-351862 | 12/1999 |
| JP | 2002026304 A * | 1/2002 |
| JP | 2004-040409 | 2/2004 |
| JP | 2004-104646 | 4/2004 |
| JP | 2004-304706 A | 10/2004 |
| WO | WO 96/38319 | 12/1996 |
| WO | WO 01/70538 | 9/2001 |
| WO | WO 2009/027134 | 3/2009 |

OTHER PUBLICATIONS

Robert F. Schmidt et al., "Neuro- und Sinnesphysiologie" ("Neuro- and Sensory Physiology"), Springer Instructional Book, 5$^{th}$ Edition, Chapter 10, 2006, Heidelberg, Germany, pp. 243 to 273, with partial English translation of pp. 265 to 267.

US Office Action in U.S. Appl. No. 14/636,773, mailed Dec. 8, 2015, 16 pages.

U.S. Office Action in U.S. Appl. No. 14/636,617, mailed Feb. 9, 2016, 24 pages.

US Final Office Action in U.S. Appl. No. 14/636,773, mailed Jun. 15, 2016, 19 pages.

* cited by examiner

| N | R | N | R |
|---|---|---|---|
| N | N | N | N |
| N | R | N | R |
| N | N | N | N |

| N | R | N | R |
|---|---|---|---|
| N | R | N | R |
| N | R | N | R |
| N | R | N | R |

| R | R | R | R |
|---|---|---|---|
| N | N | N | N |
| R | R | R | R |
| N | N | N | N |

FIG. 6

| N | R | N | R |
|---|---|---|---|
| G | N | G | N |
| N | R | N | R |
| G | N | G | N |

MONITORING UNIT AND ASSISTANCE SYSTEM FOR MOTOR VEHICLES

BACKGROUND OF THE INVENTION

Field of the Invention

The present invention relates to a monitoring unit for the outside in a motor vehicle's direction of travel, which unit includes at least one camera system having an image-recording sensor.

The present invention further relates to an assistance system for motor vehicles, in particular for traffic-sign and/or traffic-lane registering, having at least one monitoring unit registering the outside in the motor vehicle's direction of travel, with said monitoring unit including at least one camera system having an image-recording sensor.

Background Information

Intelligent Advanced Driver Assistance Systems (ADAS) will play an increasingly important role in up-to-date motor vehicles of the future. Said vehicles will contain, for example, monitoring units such as camera systems having, for instance, digital CMOS (Complementary Metal-Oxide Semiconductor) or CCD (Charge-Coupled Device) image sensors as aids that register the outside, for example in the motor vehicle's direction of travel.

Pure black/white (B/W)—that is to say monochrome—image recording is for most tasks more favorable than color image recording in association with image-processing systems of said type employed in the automobile sector for registering travel environments. However, applications do exist where color information obtained from, for example, the three RGB primary colors red (R), green (G), and blue (B), and/or other colors such as, for instance, yellow (Y) etc. can be important for attaining a higher confidence level for the output vector generated by an image-processing means.

An instance thereof is traffic-sign recognition, with its being possible to recognize by way of the, where applicable, individual color information (R and/or G and/or B, and/or other colors such as, for instance, Y etc.) whether the sign concerned is a prohibition sign or a sign giving orders, or one that purely provides information.

Another function is recognizing colored lane markings associated with, for example, roadworks. Color information is helpful here, too, and necessary to be able, for example, to distinguish between the normal white markings that are no longer valid and the additional yellow lane markings.

Conversely, purely monochrome (B/W) image recording will suffice for the purpose of recognizing objects such as obstacles, other vehicles, and cyclists or other persons because color information (R, G, B, Y etc.) will as a rule not provide better recognition quality.

SUMMARY OF THE INVENTION

An object of an embodiment of the invention is to provide an improved monitoring unit for the outside in a motor vehicle's direction of travel, which unit includes at least one camera system having an image-recording sensor. An object of another embodiment of the invention is to provide an improved assistance system for motor vehicles, in particular for traffic-sign and/or traffic-lane registering. The above objects can be achieved by one or more embodiments of the invention disclosed herein.

The invention builds on generic monitoring units for the outside in a motor vehicle's direction of travel in that the monitoring unit includes at least one camera system having an image-recording sensor having color coding (R, G, B, Y, . . . ) in partial areas but otherwise monochrome coding (B/W). The present invention thus proceeds from an image-recording sensor that is substantially embodied as monochrome (B/W) or, as the case may be, coded and inventively has color coding (R and/or G and/or B and/or other colors such as, for instance, Y etc.) in partial areas.

For the purpose of recognizing or, as the case may be, assigning specific colors of traffic signs it is proposed providing a color coding (R and/or G and/or B and/or other colors such as, for instance, Y etc.) of vertical stripes and/or areas on the right-hand and/or left-hand image edge. Because traffic signs move from the center of the image outward from the perspective of a camera mounted in the front area of a motor vehicle traveling in a straight line, the color of the sign and the basic information associated therewith (prohibition, orders, other information) can be advantageously determined when the sign is located within the color-coded stripes or, as the case may be, areas.

For the purpose of recognizing a lane marking's for instance yellow or white color it is proposed providing a color coding (R and/or G and/or B and/or other colors such as, for instance, Y etc.) of horizontal stripes and/or areas on the sensor's bottom image edge, preferably in the area where the camera has a view onto the road directly over the hood, particularly in the case of a customary automobile. The camera can, of course, be arranged analogously when the inventive monitoring unit is employed in a truck or van etc. As said area is not absolutely essential for image evaluating in terms of object detecting or lane registering it can advantageously be used for color-recognition purposes. Because traffic lanes can be seen from the center/top of the central image area down to the bottom left-hand or, as the case may be, right-hand image area when the camera is mounted on the front of a vehicle traveling in a straight line, then in addition to the traffic lane's position the color can advantageously be determined and made available to an image-processing system.

In order to obtain the desired color information (R and/or G and/or B and/or other colors such as, for instance, Y etc.) it is proposed attaching a tiny color filter, where applicable specifically accommodated to the application, in front of each individual cell (pixel) of the stripes or, as the case may be, areas concerned.

The color-coded stripes and/or areas are in a first embodiment embodied as, for example, a single color (R; Y; etc. . . . ) The vertical stripes and/or areas expediently have, for example, a red (R) color coding and the horizontal stripes and/or areas preferably a yellow (Y) color coding.

The color-coded horizontal and vertical stripes and/or areas can alternatively or additionally be embodied as a combination of two colors (R, G). In particular vertical stripes and/or areas having red (R) and green (G) color coding have proved useful for increasing the contrast of signs that give orders and are placed in front of trees.

For obtaining the desired color information (R, G, B) it is proposed in a further embodiment to arrange a tiny color filter in one of the three RGB primary colors red (R), green (G), and blue (B) in front of each individual cell (pixel) of the stripes or, as the case may be, areas concerned, with said filters being arranged preferably in what is termed the "Bayer pattern".

The invention further comprises an assistance system having a monitoring unit of the aforementioned type. The monitoring unit's advantages will in this way also come to bear within the scope of an overall system, in particular for traffic-sign and/or traffic-lane registering. The ratio of monochrome coding (B/W) to partial color coding is therein preferably 80:20%. Depending on the focus of the specific application the partially color-coded areas can also occupy 25% or up to 40% of the sensor surface.

The main advantage of an inventive monitoring unit for the outside in a motor vehicle's direction of travel or, as the case may be, of an assistance system for motor vehicles including said type of monitoring unit having a partially color-coded (R and/or G and/or B and/or other colors such as, for instance, Y etc.) camera is that all relevant data for registering travel environments can for the first time be obtained using just one camera. Owing to the camera's substantially monochrome (B/W) image recorder there will be no constraints on sensitivity so that reliable evaluating will be ensured even in poor light conditions; the color coding (R and/or G and/or B and/or other colors such as, for instance, Y etc.) in the sensor's edge area will not compromise applications for which the purely monochrome (B/W) image is more favorable.

By contrast, color coding (R and/or G and/or B and/or other colors such as, for instance, Y etc.) having vertical stripes and/or areas on the right-hand and/or left-hand edge of the sensor's image field will provide reliable information about the color (R, G, B, Y, . . . ) of traffic signs; the color coding (R, G, B, Y, . . . ) in the bottom image area will provide reliable information about the color of lane markings.

A single camera can thus be used for all relevant applications, and that will advantageously save costs and mounting space.

BRIEF DESCRIPTION OF THE DRAWINGS

The invention is described below with reference to the accompanying drawing and with the aid of a preferred exemplary embodiment.

DESCRIPTION OF THE PREFERRED EMBODIMENTS

Figure 1:
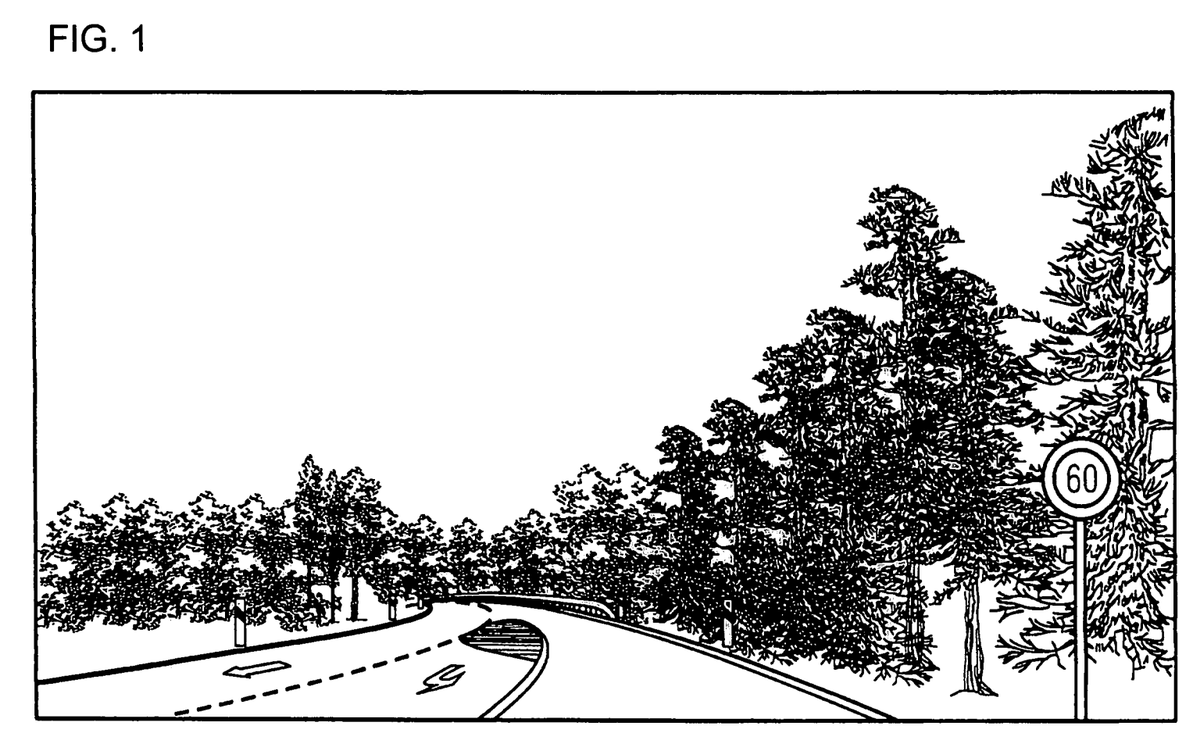
FIG. 1 is the exemplary image, shown in monochrome (B/W), of a scene outside a motor vehicle.

FIG. 1 is the exemplary image, shown in monochrome, of a scene outside a motor vehicle. What is disadvantageous about black/white (B/W) image recording of said type is the lack of color information that could be obtained from, for example, the three primary colors red (R) and/or green (G) and/or blue (B) and/or other colors such as, for instance, Y etc.

Color information (R, G, B, Y, . . . ) of said type can be important for attaining a higher confidence level for the output vector generated by an image-processing means, in particular for recognizing traffic signs, with its being possible to recognize by way of the color information (R and/or G and/or B and/or other colors such as, for instance, Y etc.) whether the sign concerned is a prohibition sign or a sign giving orders—as in the case of the speed-limit sign on the right of the image section shown FIG. 1—or one that purely provides information (not shown).

A further function is recognizing colored lane markings associated with roadworks. It is helpful here and necessary to distinguish between the normal white markings that are no longer valid and the additional yellow lanes.

Conceivable solutions featuring an exclusively color-coded (R, G, B, Y, . . . ) image recorder are not only more compute-bound and hence more expensive; they also have the disadvantage that monochrome (B/W) images are more favorable for a number of outside applications, in particular for the purpose of detecting objects such as obstacles, other vehicles, and cyclists or other persons and the like, or night-time applications.

To resolve this conflict of requirements the present invention proposes the use in a generic monitoring unit of a, for example, specially embodied CCD sensor 10 having color coding (R, G, B, Y, . . . ) in partial areas 11, 12, 13 but otherwise monochrome coding (B/W). The present invention in other words proceeds from a sensor 10 that is embodied as substantially monochrome (B/W) or, as the case may be, coded and has color coding (R, G, B, Y, . . . ) in partial areas. That could be achieved by means of, for instance, a color coding (R, G, B, Y, . . . ) of vertical stripes (not shown) or areas on the right-hand 11 and left-hand 12 image edge, and would be helpful, for example, for assigning traffic signs the correct color (R, G, B, Y, . . . ). Because the traffic signs move from the center of the image outward from the perspective of a camera mounted in the front area of a motor vehicle traveling in a straight line, the color (R, G, B, Y, . . . ) of the sign can be determined when the sign is located within the color-coded (R, G, B, Y, . . . ) stripes or, as the case may be, areas 11, 12.

The expedient approach for recognizing the color of the traffic lane (yellow or white, for example) is also to provide color coding, in particular yellow (Y) coding, in the bottom area 13 of the sensor 10, preferably in the area where the camera has a view onto the road directly over the hood in the case of a customary automobile. As said area is not absolutely essential for image evaluating in terms of object detecting or lane registering it can be used for color-recognition (Y) purposes. Because traffic lanes can be seen from the center/top of the central image area down to the bottom left-hand and right-hand image area when the camera is mounted on the front of a vehicle traveling in a straight line, then in addition to the traffic lane's position the color can be determined and made available to an image-processing system. This feature is not, of course, restricted to motor vehicles having a hood but can be realized analogously when the inventive monitoring unit is employed in particular in a truck or van etc.

Especially in the case also of night-vision applications the best possible sensitivity is necessary across the entire, which is to say unfiltered, wavelength spectrum, including the near infrared. Since, though, a much smaller angular range generally has to be detected here, it suffices to provide a smaller central area with no color coding.

Figure 2:
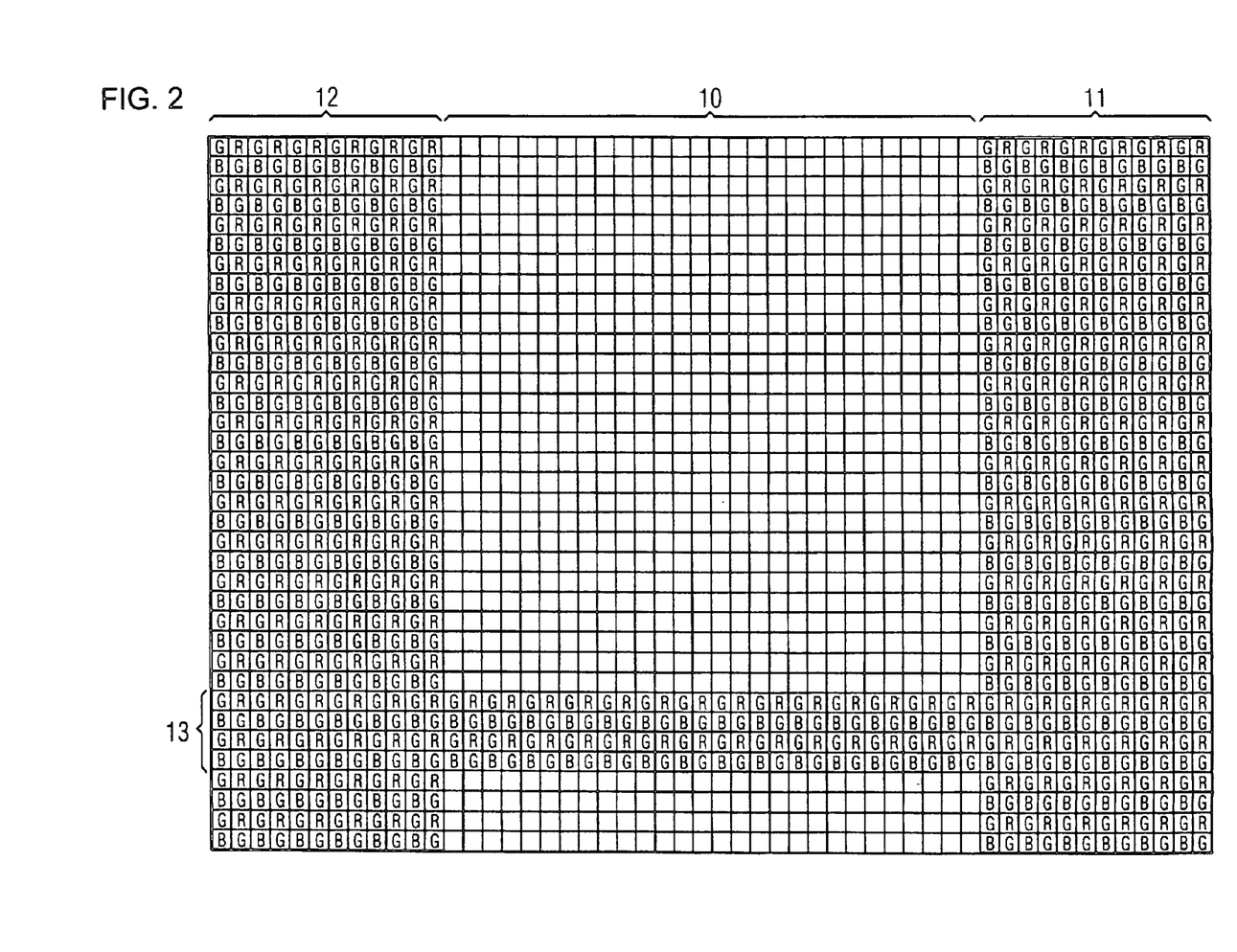
FIG. 2 is a schematic sketch of a possible color-filter distribution (R, G, B) of the image recorder of a monitoring unit's camera.

FIG. 2 is a schematic sketch of a possible color-filter distribution (R, G, B) of the image recorder 10 of a monitoring unit's camera. The light-sensitive cells of a non-color-coded (N) CCD sensor 10 in the monitoring unit's digital camera normally only register brightness values. In order to obtain color information (R, G, B, Y, . . . ) a tiny color filter is to be attached in front of each individual cell for example in one of the three RGB primary colors red (R), green (G), and/or blue (B), and/or another color such as, for instance, yellow (Y) etc. Filters constructed from primary colors are usually attached in the arrangement R-G-R-G and, in the next line, G-B-G-B, and in this arrangement produce what is termed the "Bayer pattern".

Figure 3:
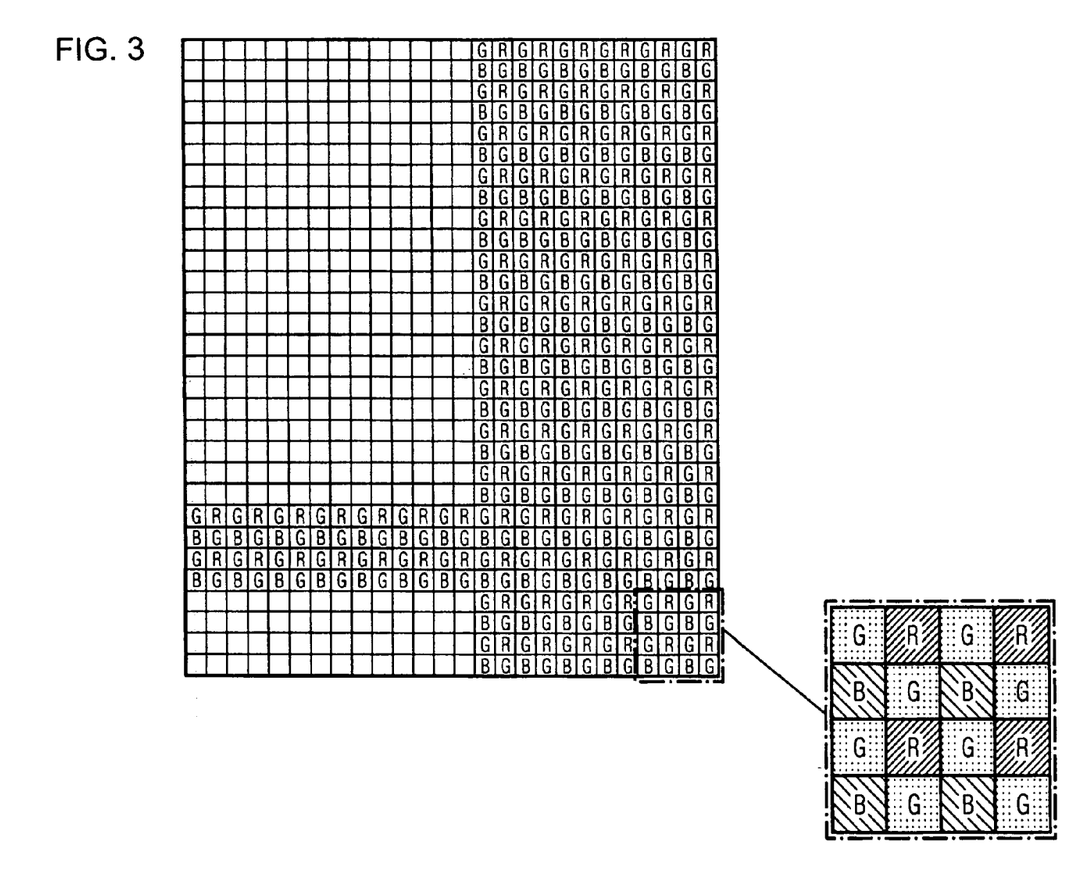
FIG. 3 shows an enlarged section of the color-filter distribution according to FIG. 2.

FIG. 3 shows an enlarged section of the color-filter distribution (R, G, B) according to FIG. 2 arranged in the Bayer pattern, which is a known repeating pattern of 2×2 pixel groups that each include two green pixels diagonally opposite one another as well as a red pixel and a blue pixel diagonally opposite one another in a square dimensioned 2 pixels by 2 pixels as shown in FIGS. 2 and 3. It can clearly be seen how each CCD element only supplies the information for a single color component so that the adjacent pixels accordingly have to be used for calculating the actual color. This process is referred to as "color interpolating".

Color information useful in the context of road traffic can be obtained within the Bayer-pattern coded stripes or, as the case may be, areas 11, 12, 13 of the sensor 10 by means of color interpolating of said type and made available to an image-processing system.

Figure 4:
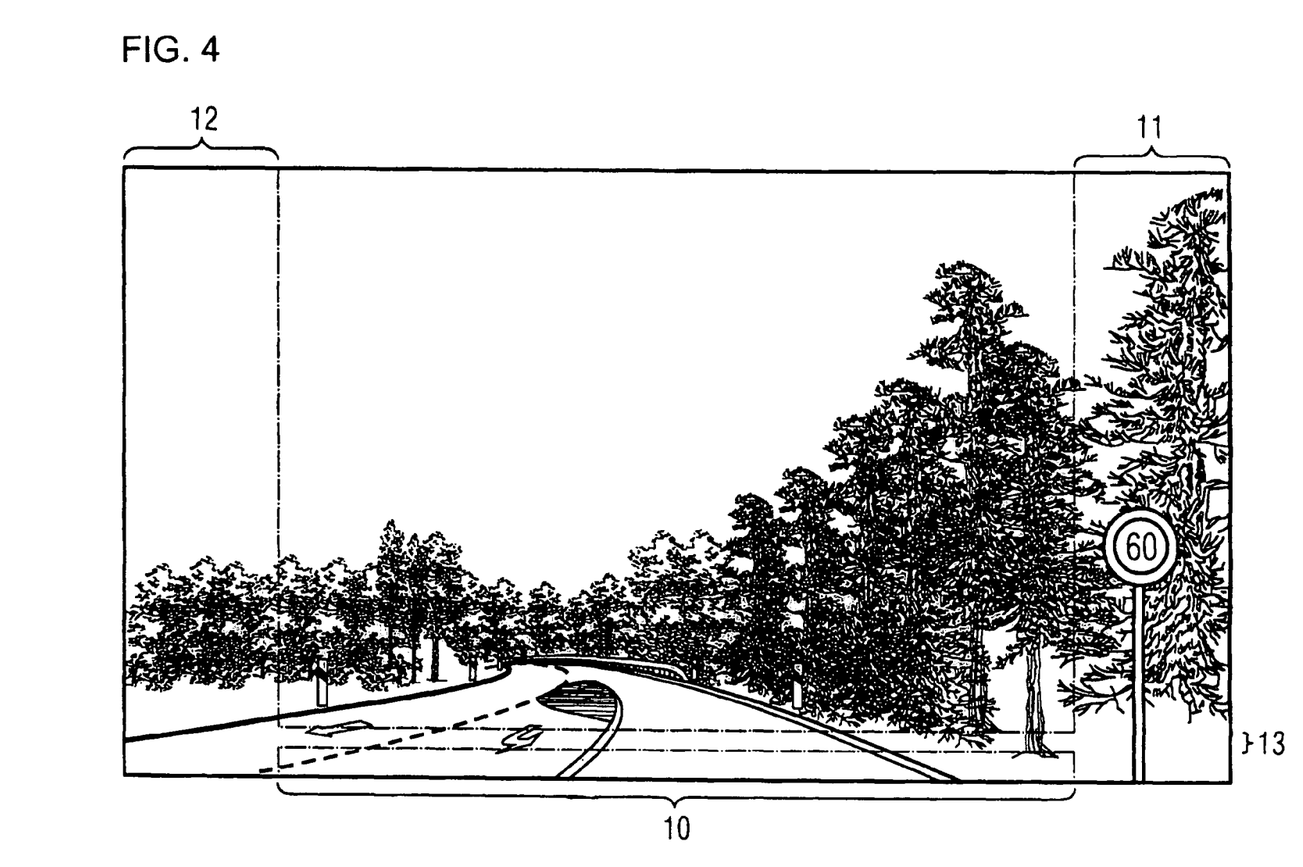
FIG. 4 is the exemplary image according to FIG. 1 showing a scene outside that has been partially color-coded according to FIG. 2.

The corresponding exemplary image according to FIG. 1 showing a scene outside that has been partially color-coded according to FIG. 2 is shown in FIG. 4.

The color information does not have to consist of the three primary colors: It is also possible only to use single color filters such as, for instance, red (R) for signs giving orders or yellow (Y) for lane markings associated with, for example, roadworks. Combinations of red (R) and green (G) color filters or others specifically accommodated to the application have also proved useful for increasing the contrast of signs that give orders and are placed in front of trees. Color filters of said type can advantageously also be arranged spaced apart, being located, for example, on every other pixel in a row and/or column; that means in any combination with non-coded (N) pixels or pixels coded in another color or, as the case may be, where applicable specifically accommodated color filters.

Figure 5:
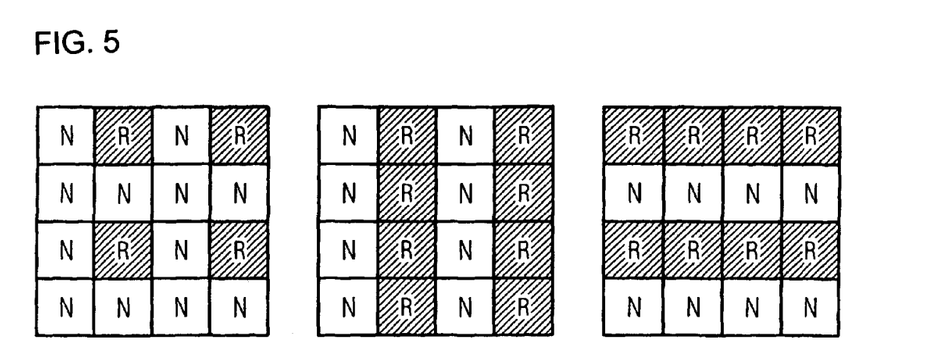
FIGS. 5 and 6 are further instances of a color-filter distribution of a monitoring unit's image recorder.
Figure 6:
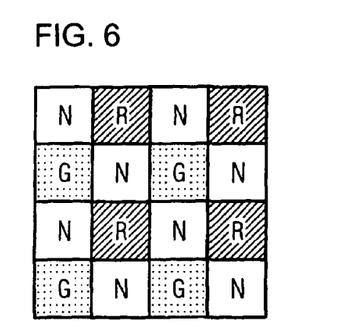

FIGS. 5 and 6 show arrangements of pixels in various different repeating patterns of 2×2 pixel groups and further instances of color coding that offer the above advantages and can be used instead of the known "Bayer pattern".

FIG. 5 shows clearly how 2×2 pixel groups that each include one or two red (R) pixels and three or two monochrome (N) pixels can be configured and arranged so that only every other pixel in a row and/or every other column has been provided with red color filters (R) for recognizing, for instance, signs giving orders.

FIG. 6 shows the advantageous embodiment of a combination of two colors. Instead of R-G-R-G and in the next row G-B-G-B as in the case of the "Bayer pattern", color filters are used in the pattern R-N-R-N and in the next row N-G-N-G, with N signifying no color coding. In this case, each 2×2 pixel group includes two N pixels diagonally opposite one another, as well as an R pixel and a G pixel diagonally opposite one another as shown in FIG. 6.

The main advantage of a partially color-coded camera is that all relevant data for registering travel environments can be obtained using just one camera. Owing to the camera's substantially monochrome (B/W) image recorder there will be no constraints on sensitivity so that reliable evaluating will be ensured even in poor light conditions; the color coding (R, G, B, Y, . . . ) in defined edge areas 11, 12, 13 of the sensor 10 will not compromise applications for which the purely monochrome (B/W) image is more favorable. By contrast, color coding (R, G, B, Y, . . . ) having vertical stripes or areas 12 on the left-hand edge and vertical stripes or areas 11 on the right-hand edge of the sensor's image field will provide reliable information about the color (R, G, B, Y, . . . ) of traffic signs; the color coding (R, G, B, Y, . . . ) in the bottom image area 13 will provide reliable information about the color of traffic lanes.

A single camera can thus be used for all applications, and that will advantageously save costs and mounting space.

The present invention is thus especially suitable for implementation in an assistance system for motor vehicles, in particular for traffic-sign and/or traffic-lane registering. It will advantageously increase road-traffic safety not only in combination with existing assistance systems for motor vehicles such as blind-spot detection, LDW (Lane Departure Warning) lane monitoring, night vision etc.

We claim:

1. A monitoring unit for an exterior of a motor vehicle in a direction of travel of the motor vehicle, which comprises at least one camera system with an image-recording sensor, said sensor having color encoding only in partial areas thereof, and said sensor having monochrome encoding in remaining areas thereof,
    wherein said partial areas and said remaining areas together make up an entire image-recording field of said sensor,
    wherein said remaining areas that have the monochrome encoding cover a center of said image-recording field of said sensor,
    wherein said partial areas that have the color encoding comprise first and second vertical stripes respectively on a right-hand image edge and a left-hand image edge of said sensor, and
    wherein said remaining areas that have the monochrome encoding include first and second remaining areas that are respectively provided along a top image edge and a bottom image edge of said sensor, adjoining and between the first and second vertical stripes.

2. The monitoring unit according to claim 1, wherein said partial areas that have the color encoding further comprise a horizontal stripe extending between and interconnecting the first and second vertical stripes, wherein the horizontal stripe is located between the first and second remaining areas and separates the first and second remaining areas from one another.

3. The monitoring unit according to claim 2, wherein the horizontal stripe is configured and located to coincide with a view of said sensor onto a road directly over a front hood of the motor vehicle, and the second remaining area is provided below the horizontal stripe.

4. The monitoring unit according to claim 1, wherein said first and second vertical stripes comprise sensor pixels of said sensor that are color encoded only in a single color.

5. The monitoring unit according to claim 1, wherein said first and second vertical stripes comprise sensor pixels of said sensor that are color encoded only with red color encoding.

6. The monitoring unit according to claim 5, wherein said partial areas that have the color encoding further comprise a horizontal stripe and/or a horizontally extending elongated area comprising sensor pixels of said sensor that are color encoded only with yellow color encoding.

7. The monitoring unit according to claim 1, wherein said partial areas that have the color encoding comprise sensor pixels of said sensor that are color encoded respectively in only two colors.

8. The monitoring unit according to claim 7, wherein the two colors are red and green.

9. The monitoring unit according to claim 1, wherein a ratio of the monochrome encoding to the color encoding is 60:40.

10. The monitoring unit according to claim 1, wherein a ratio of the monochrome encoding to the color encoding is 75:25.

11. The monitoring unit according to claim 1, wherein a ratio of the monochrome encoding to the color encoding is 80:20.

12. The monitoring unit according claim 1, wherein said partial areas that have the color encoding further comprise a horizontal stripe and/or a horizontally extending elongated area comprising sensor pixels of said sensor that are color encoded only with yellow color encoding.

13. The monitoring unit according to claim 1, wherein said partial areas consist of color-encoded pixels of said sensor that have the color encoding.

14. The monitoring unit according to claim 1, wherein said partial areas include color-encoded pixels of said sensor that have the color encoding, and further include monochrome pixels of said sensor that have monochrome encoding, wherein the color-encoded pixels and the monochrome pixels in said partial areas are arranged in a repeating pattern of 2×2 pixel groups of the color-encoded pixels and the monochrome pixels, and wherein said remaining areas consist of monochrome pixels of said sensor that have the monochrome encoding.

15. An imaging system for imaging an area of an environment outside of a motor vehicle,
comprising an imaging sensor having an image-recording field made up of photosensitive pixels including color-coded pixels and non-color-coded pixels,
wherein:
said image-recording field includes first and second areas consisting of a plurality of said non-color-coded pixels, and elongated third, fourth and fifth areas comprising a plurality of said color-coded pixels,
said first area extends along a portion of a first edge of said image-recording field,
said second area extends along a portion of a second edge of said image-recording field, wherein said second edge is opposite and parallel to said first edge,
said third area extends along a third edge of said image-recording field, wherein said third edge is perpendicular to and interconnects said first and second edges,
said fourth area extends along a fourth edge of said image-recording field, wherein said fourth edge is opposite and parallel to said third edge,
said fifth area extends between and interconnects said third and fourth areas, and
said first and second areas are on opposite sides of and separated from one another by said fifth area.

16. The imaging system according to claim 15, wherein said first area includes a group of said non-color-coded pixels at and around a center of said image-recording field.

17. The imaging system according to claim 15, wherein each one of said third, fourth and fifth areas respectively further comprises another plurality of said non-color-coded pixels, and wherein said photosensitive pixels in said third, fourth and fifth areas are arranged in a repeating pattern of 2×2 pixel groups that each include at least one of said color-coded pixels and at least two of said non-color-coded pixels.

18. The imaging system according to claim 17, wherein all of said color-coded pixels in said third, fourth and fifth areas are color-coded for the same single color.

19. The imaging system according to claim 17, wherein each one of said 2×2 pixel groups consists of one of said color-coded pixels and three of said non-color-coded pixels.

20. The imaging system according to claim 17, wherein each one of said 2×2 pixel groups consists of two of said color-coded pixels and two of said non-color-coded pixels.

21. The imaging system according to claim 15, wherein all of said color-coded pixels in said third and fourth areas are color-coded only for a red color, and all of said color-coded pixels in said fifth area are color-coded only for a yellow color.

22. The imaging system according to claim 15, wherein:
said elongated third and fourth areas each respectively extend longitudinally in a vertical direction,
said elongated fifth area extends longitudinally in a horizontal direction,
said third, fourth and fifth areas together form an H-shaped configuration,
said first area is above said fifth area and between upper portions of said third and fourth areas, and
said second area is below said fifth area and between lower portions of said third and fourth areas.

23. The imaging system according to claim 22, wherein said first area covers a center of said image recording field, said fifth area is displaced below said center, and said second area is smaller than said first area.

\* \* \* \* \*